US010096097B2

(12) United States Patent
Fleizach et al.

(10) Patent No.: US 10,096,097 B2
(45) Date of Patent: Oct. 9, 2018

(54) CONTENT-AWARE BIDIRECTIONAL IMAGE EDGE HIGHLIGHTING

(71) Applicant: SPAWAR Systems Center Pacific, San Diego, CA (US)

(72) Inventors: Gregory Knowles Fleizach, San Diego, CA (US); Brian Matthew Sperlongano, North Kingstown, RI (US); Kevin Donald Casey, Alexandria, VA (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 3 days.

(21) Appl. No.: 15/225,621

(22) Filed: Aug. 1, 2016

(65) Prior Publication Data

US 2018/0033126 A1   Feb. 1, 2018

(51) Int. Cl.
*G06K 9/40*      (2006.01)
*G06T 5/20*      (2006.01)
*G06T 7/00*      (2017.01)
*G06T 5/00*      (2006.01)

(52) U.S. Cl.
CPC ............... *G06T 5/20* (2013.01); *G06T 5/002* (2013.01); *G06T 5/003* (2013.01); *G06T 7/0085* (2013.01); *G06T 7/0095* (2013.01); *G06T 2207/20192* (2013.01)

(58) Field of Classification Search
USPC ....................................................... 382/266
See application file for complete search history.

(56) References Cited

U.S. PATENT DOCUMENTS

| | | | |
|---|---|---|---|
| 7,265,873 B1 | 9/2007 | Kusumo-Rahardjo et al. | |
| 7,657,115 B2 | 2/2010 | Chen | |
| 8,417,030 B2 | 4/2013 | Peng et al. | |
| 2002/0006231 A1* | 1/2002 | Jayant | G06T 3/403 382/266 |
| 2008/0291310 A1* | 11/2008 | Ladd | H04N 5/374 348/308 |
| 2008/0298712 A1* | 12/2008 | Kang | G06T 5/004 382/266 |
| 2010/0259775 A1* | 10/2010 | Sakamoto | H04N 1/58 358/1.9 |
| 2011/0069887 A1* | 3/2011 | Bendahan | G06T 7/13 382/190 |
| 2013/0051480 A1* | 2/2013 | Norkin | H04N 19/176 375/240.29 |
| 2013/0198698 A1* | 8/2013 | Lei | G03F 1/36 716/53 |
| 2014/0086486 A1* | 3/2014 | Pillman | G06T 5/003 382/173 |
| 2014/0148451 A1* | 5/2014 | MacKeigan | C07D 219/08 514/232.8 |

(Continued)

*Primary Examiner* — Jerome Grant, II
(74) *Attorney, Agent, or Firm* — SPAWAR Systems Center Pacific; Kyle Eppele; Young Fei

(57) ABSTRACT

A method for highlighting edges of interest in an image comprising the following steps: calculating edge intensity of edges in the image using gradient operators; applying a transformation to emphasize mid-level edges and deemphasize strong edges; and if a given transformed edge is greater than a threshold value, highlighting the corresponding edge in an edge-highlighted image.

9 Claims, 6 Drawing Sheets

(56) References Cited

U.S. PATENT DOCUMENTS

| | | | |
|---|---|---|---|
| 2015/0116353 A1* | 4/2015 | Miura | G06T 11/60 |
| | | | 345/632 |
| 2015/0168733 A1* | 6/2015 | Rumreich | G02B 26/101 |
| | | | 348/744 |
| 2015/0313983 A1* | 11/2015 | Rikihisa | A61K 39/0233 |
| | | | 424/497 |
| 2015/0339807 A1* | 11/2015 | Beardsley | G06K 9/40 |
| | | | 382/274 |
| 2015/0381869 A1* | 12/2015 | Mlinar | H04N 5/23212 |
| | | | 348/222.1 |
| 2016/0048952 A1* | 2/2016 | Tezaur | G06T 5/004 |
| | | | 382/255 |
| 2016/0055400 A1* | 2/2016 | Jorquera | F03D 1/06 |
| | | | 416/1 |
| 2016/0132242 A1* | 5/2016 | Mehrotra | G06F 12/0246 |
| | | | 711/103 |
| 2017/0154241 A1* | 6/2017 | Shambik | G06K 9/6202 |
| 2017/0169992 A1* | 6/2017 | Kobayashi | H01J 37/265 |
| 2017/0251194 A1* | 8/2017 | Plank | H04N 13/0037 |

* cited by examiner

CONTENT-AWARE BIDIRECTIONAL IMAGE EDGE HIGHLIGHTING

FEDERALLY-SPONSORED RESEARCH AND DEVELOPMENT

The United States Government has ownership rights in this invention. Licensing and technical inquiries may be directed to the Office of Research and Technical Applications, Space and Naval Warfare Systems Center, Pacific, Code 72120, San Diego, Calif., 92152; voice (619) 553-5118; ssc_pac_t2@navy.mil. Reference Navy Case Number 103219.

BACKGROUND OF THE INVENTION

Typical edge detection schemes (Sobel, Canny, etc.) produce a binary output because after the gradient operators are applied, a threshold is applied to the result. Any pixels greater than the threshold are declared edges. The binary detected edge images are often unsatisfactory. Existing edge highlighting schemes retain the original image, but attempt to enhance the edges while leaving the rest of the image unchanged. Often, this is nothing more than the binary edge detection superimposed on the original image. There are two problems with the output image in this case. The first is that strong edges are highlighted more than mid-level edges, which are really where the interesting information is found (the noise is represented by the weak edges). The second problem is that the edges are either bright or dark, which often does not produce the optimal result. Ideally, the edge-highlighted image should enhance the mid-level edges more than the strong and weak edges, and the highlighting should consider whether the edge is in a dark region of the image (use bright highlighting) or a bright region of the image (use dark highlighting).

Prior systems made no attempt to emphasize weaker edges over stronger edges. In most case, the strong edges are quite obvious (e.g., a large shadow traversing the image) so there is no use in highlighting these edges further. Otherwise, prior systems would enhance all edges uniformly, which can amplify the noise and make the image look grainy. Other methods highlight the edges unidirectionally by either forcing them dark or light with the decision made a priori, without regard to the image content. This often produces suboptimal results because many images contain both light and dark regions simultaneously. Other prior systems use complicated decision circuitry to classify the edges as straight, angled, light, or dark so they can be adjusted differently. These rules make the edge highlighting systems unnecessarily complex and also may cause them to fail at strong edges.

SUMMARY

Disclosed herein is a method for highlighting edges of interest in an image comprising the following steps. The first step provides for calculating edge intensity of edges in the image using gradient operators. The next step provides for applying a transformation to emphasize mid-level edges and deemphasize strong edges. The next step provides for highlighting a given edge in an edge-highlighted image if the corresponding transformed edge is greater than a threshold.

The edge-highlighting method may also be described as comprising the following steps. The first step provides for calculating edge intensity of the image using horizontal and vertical gradient operators, wherein the image comprises rows and columns of pixels. The next step provides for combining results from the horizontal and vertical gradient operators to produce a single image, which contains the relative intensity strengths (edge_strength) of all the edges in the image. The next step provides for transforming the edge_strength image according to the following equation:

if(edge_strength[$n, m$] > max(edge_strength)/2)
{ edge_strength[$n, m$] = max(edge_strength) − edge_strength[$n, m$];
} where edge_strength[n,m] is the edge strength value of a pixel at row n, column m, and max(edge_strength) is a maximum value of edge_strength over the entire image such that mid-level intensity edges are emphasized and strong intensity edges are deemphasized. The next step provides for normalizing results of the transformation to put the transformed edge strength values into the range [0,1]. The next step provides for bidirectionally highlighting a given edge in the original image if a corresponding transformed edge is greater than a threshold value to create an edge-highlighted image.

BRIEF DESCRIPTION OF THE DRAWINGS

Throughout the several views, like elements are referenced using like references. The elements in the figures are not drawn to scale and some dimensions are exaggerated for clarity.

DETAILED DESCRIPTION OF EMBODIMENTS

The disclosed methods and systems below may be described generally, as well as in terms of specific examples and/or specific embodiments. For instances where references are made to detailed examples and/or embodiments, it should be appreciated that any of the underlying principles described are not to be limited to a single embodiment, but may be expanded for use with any of the other methods and systems described herein as will be understood by one of ordinary skill in the art unless otherwise stated specifically.

Figure 1:
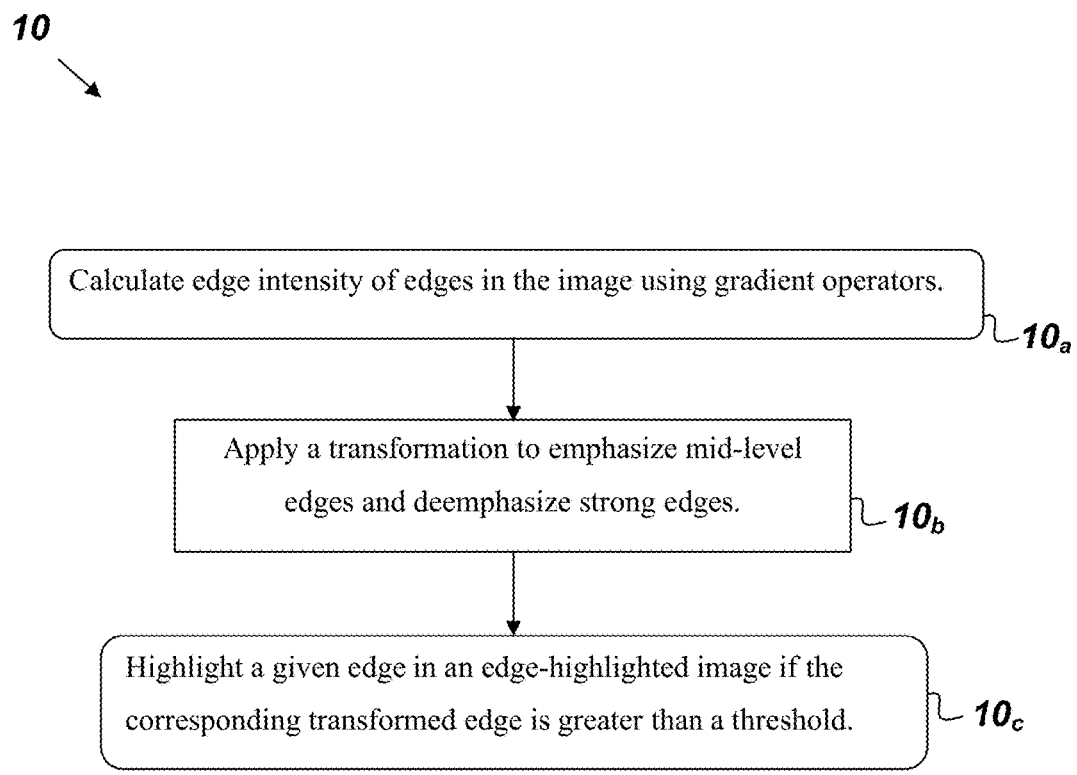
FIG. 1 is a flowchart.

FIG. 1 is a flowchart of an embodiment of a method 10 for highlighting edges of interest in an image, wherein the edge-highlighting method 10 comprises, consists of, or consists essentially of the following steps. The first step 10$_a$ provides for calculating edge intensity of edges in the image using gradient operators. The next step 10$_b$ provides for applying a transformation to emphasize mid-level edges and deemphasize strong edges. The next step 10$_c$ provides for highlighting a given edge in an edge-highlighted image if the corresponding transformed edge is greater than a threshold.

Figure 2:
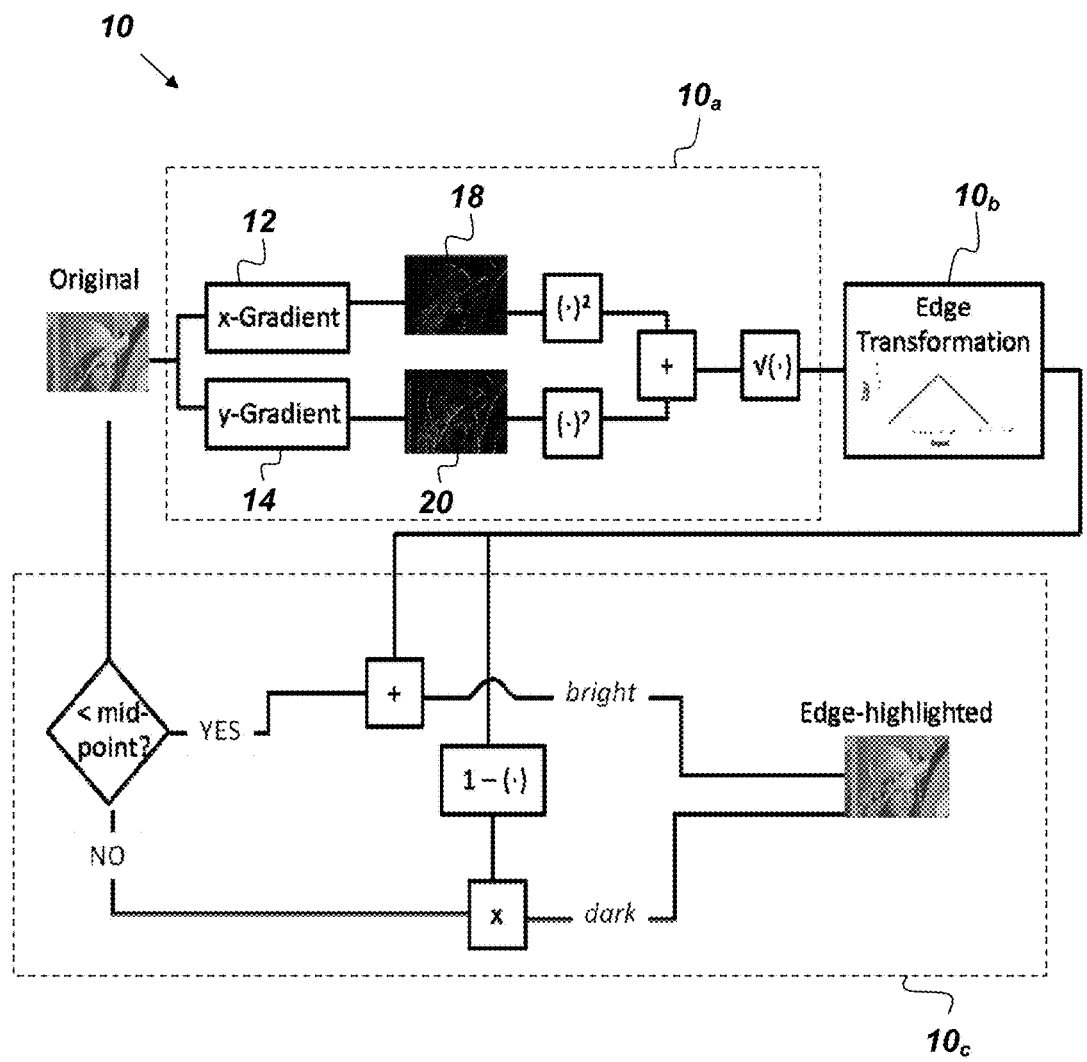
FIG. 2 is a block diagram.

FIG. 2 is a block diagram depicting an embodiment of edge-highlighting method 10. In this embodiment, the gradient operators (horizontal gradient operator 12 and vertical gradient operator 14) process the original image 16 to produce two processed images (horizontal edge image 18 and vertical edge image 20), which are subsequently combined. The original image 16 may be any single still image or series of images for a video having any desired content. For example, suitable examples of the image 16 include, but are not limited to, a monochrome image, and the intensity image from a color image or a single color plane. The two processed images (horizontal edge image 18 and vertical edge image 20) are the same size as the original image 16. The upper operator in FIG. 2 (i.e., the horizontal gradient operator 12) finds horizontal edges and the lower operator (i.e., the vertical gradient operator 14) finds vertical edges.

By combining the two images using:

$$\text{edge\_strength} = \sqrt{(\text{sobel}\_x^2 + \text{sobel}\_y^2)} \quad (1)$$

one is able to detect edges at any orientation, where sobel_x is the result from the upper gradient operator in FIG. 2, and sobel_y is the result from the lower gradient operator in FIG. 2. In this embodiment, the gradient operators are Sobel operators, but it is to be understood that any gradient operators may be used. The gradient operators of method 10 may be any discrete differentiation operator capable of detecting edges in an image. Suitable examples of the gradient operators include, but are not limited to, Sobel operators, Roberts cross gradient operators, and Laplacian operators. The maximum value of edge_strength depends on the range of the input image. The following are examples of Sobel gradient operators:

| −1 | −2 | −1 |
|----|----|----|
| 0  | 0  | 0  |
| 1  | 2  | 1  |

| −1 | 0 | 1 |
|----|---|---|
| −2 | 0 | 2 |
| −1 | 0 | 1 |

There are alternative methods to combine the results from the two gradient operators depending on whether horizontal, vertical, or some other edges need to be highlighted preferentially. For example, another method is: edge_strength=|sobel_x|+|sobel_y|, where |•| is the absolute value operator.

The output of combining the gradient operators is a single image the same size as the original image, which contains the relative strengths of all the edges. From the edge_strength image the goal is to highlight the edges of interest in the original image 16. One way to approach the problem of edge highlighting is to threshold the edge_strength image and for every edge strength pixel above the threshold, the corresponding pixel in the original image 16 can be darkened proportional to the strength of its edge. However, this approach emphasizes the edges that are already prominent. Often, what is really of interest is to enhance the edges which are not so clear in the original image. Thus, method 10 applies a transformation to the edge_strength image that deemphasizes the strong edges that are already evident and enhances the mid-level edges that are really of interest (see step 10$_b$). A transformation that has been shown to be successful in test video is if(edge_strength[$n, m$] > max(edge_strength)/2)

{ edge_strength[$n, m$] = max(edge_strength) − edge_strength[$n, m$];

} where edge_strength[n,m] is the edge strength pixel at row n, column m, and max(edge_strength) is the maximum value of edge_strength over the entire image.

Figure 3:
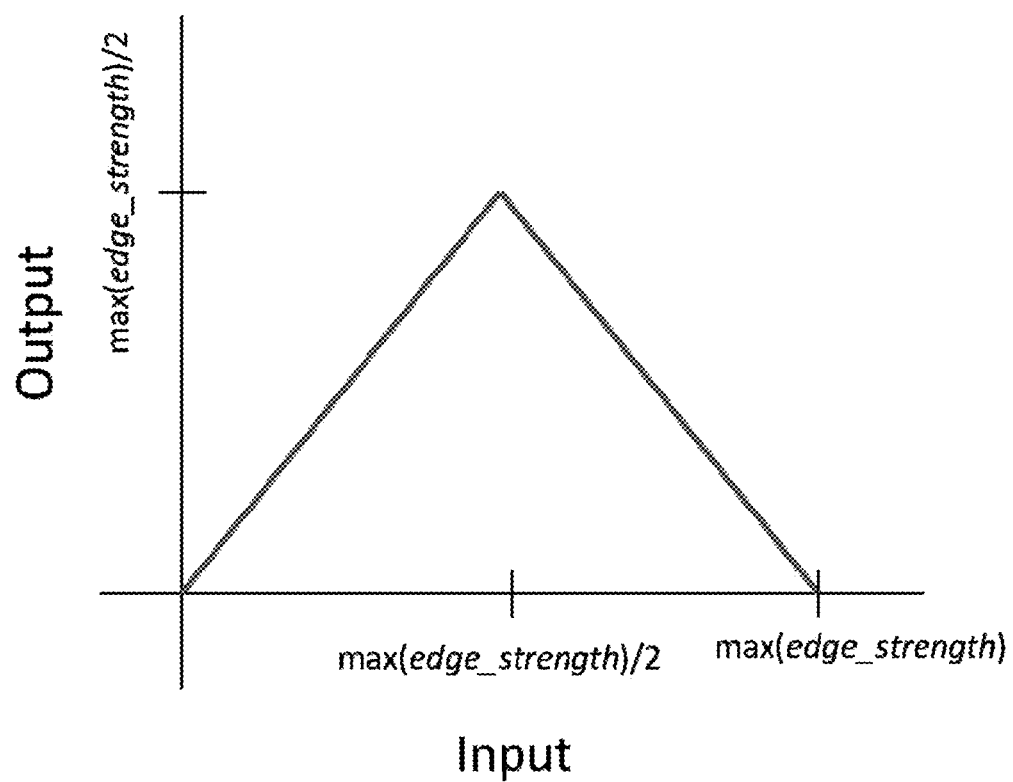
FIG. 3 is a graph of an example transformation function.

FIG. 3 is a graph of an example transformation function that may be used to highlight emphasize mid-level edges. After the transformation, the result may be normalized to put the transformed edge strength values into the range [0,1]. As can be seen from FIG. 3, the weak edges still have a small response and now the strong edges have a weak response as well. But the mid-level edges have been enhanced so that they now have the highest edge strength.

Figure 4A:
FIGS. 4A-4C are photographic images.
Figure 4B:
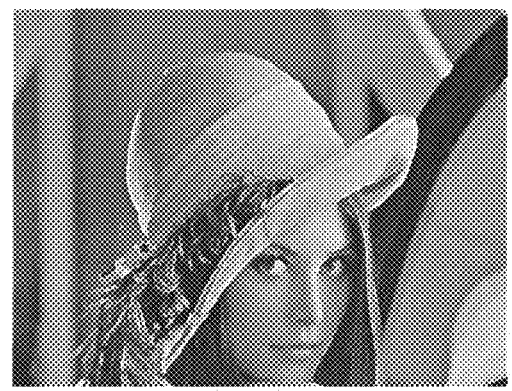
Figure 4C:

FIGS. 4A-4C show the difference such a transformation (such as is described above) can make. FIG. 4A is a reproduction of an example original image 16. When the original image 16 is processed using only gradient output directly, very little information is provided. For example, with respect to the example image, the edge around the brim of the hat is enhanced, as well as the edges in the feathers. However, after the mid-level enhancement transformation, the output of which is shown in FIG. 4C, many more edges are evident including edges on the face (nose, mouth, eyes), and even edges on the reflection in the mirror.

In order to correctly highlight the edges that one wants to highlight, one must consider the brightness of the original image in applying the edge highlighting. Unidirectional edge highlighting (e.g., highlighting all edges in shades of white or all edges in shades of black) is suboptimal because images often contain both bright and dark regions. In a bright region, white highlighting is be difficult to see and might in fact diminish edges visible in the original image. A preferable approach uses content-aware bidirectional edge highlighting. That is, based on the content of the original image at the edge of interest, the edge highlighting is either dark or bright. For example, in a light region of the image, the highlighting would be dark to make the edge more prominent and vice versa for a dark region of the image. A simple and effective way to implement content-aware edge highlighting is to simply examine the intensity of the pixel in the original image at the current edge_strength pixel of interest. An intuitive scheme is to check, for each edge pixel to be highlighted, whether the intensity value in the original image is above the mid-point in the intensity range. If the intensity value is above the mid-point (e.g., 0.5 for range [0,1] or 127 for range [0,255]) then the edge highlighting should be dark, but if the intensity value is below the mid-point then the edge highlighting should be bright.

The actual edge highlighting can be accomplished as follows. Assuming edge_strength and the original image, a, are both normalized to the same range, say, [0,1], then for pixels in the original image where the intensity is less than the mid-point of the range, the edge highlighted image, a_edge is if($a[n, m]$ < 0.5)

{ a_edge[$n, m$] = $a[n, m]$ + edge_strength[$n, m$];

} and for pixels in the original image where the intensity is greater than or equal to the mid-point of the range, the edge highlighted image is

```
else
    { a_edge[n, m] = a[n, m] · (1 − edge_strength[n, m]);
    }
```

Figure 5A:
FIGS. 5A-5*d* are photographic images, some with edge highlighting.
Figure 5B:
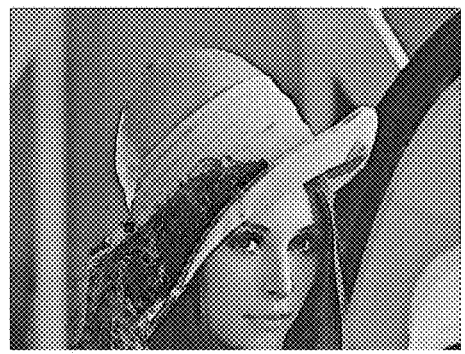
Figure 5C:
Figure 5D:

FIGS. 5A-5D are a series of photos showing an original image (i.e., FIG. 5A) and the results of different methods of edge highlighting. The results of bidirectional highlighting compared to unidirectional highlighting may be seen in the difference between FIGS. 5B-5D. In FIG. 5B, unidirectional dark edge highlighting is used, which makes the image look blurred. The edges are less clear in FIG. 5B than in the original image shown in FIG. 5A. In FIG. 5C, unidirectional bright highlighting is used, which looks a little better for this example image than the unidirectional dark edge highlighting, however some edges are lost such as on the right side of the nose, and the white diagonal strip in the top right corner of the image. The image in FIG. 5C with unidirectional bright highlighting also looks a bit washed out with all the white. In contrast, in FIG. 5D, bidirectional edge highlighting is used, which enhances edges as one would intuitively expect, helping an observer focus on the salient portions of the image. For example in the bidirectionally-highlighted image of FIG. 5D, the edges on the brim of the hat are now evident; and in general, the edges are much easier to pick out for an observer. FIG. 5D essentially retains the best edges from the bright and dark unidirectional results. In a monochrome image, the edges may be highlighted bidirectionally with two colors instead of white and black.

The bidirectional edge highlighting may be applied in methods other than that shown above. For example, the inverse of edge_strength may be used instead of subtracting from one. That is, for a pixel in the original image that is greater than the mid-point of the range, the expression a_edge[n,m]=a[n,m]/edge_strength[n,m];

may be used instead.

Figure 6:
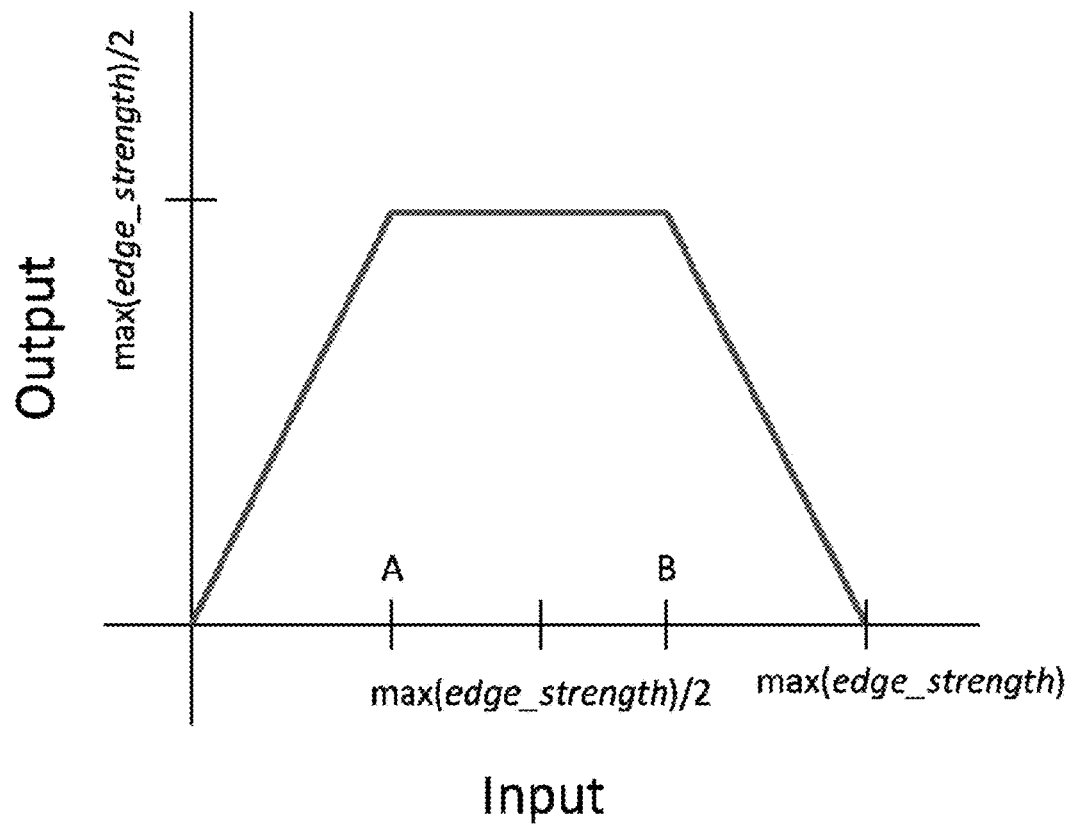
FIG. 6 is a graph of an example transformation function.

FIG. 6 is a graph of another transformation that may be used to highlight mid-level edges and deemphasize strong edges. In this transformation, instead of having a peak at max(edge_strength)/2 as shown in FIG. 3, the transformation function can have a constant response over some range as may be seen in FIG. 6. The values of edge_strength may be clipped to a certain value if it has a long-tail distribution. That is, for the transformation to enhance mid-level edges to be successful, some of the largest values in edge_strength may have to be ignored to get a meaningful transformation.

From the above description of the edge highlighting method 10, it is manifest that various techniques may be used for implementing the concepts of method 10 without departing from the scope of the claims. The described embodiments are to be considered in all respects as illustrative and not restrictive. The method/apparatus disclosed herein may be practiced in the absence of any element that is not specifically claimed and/or disclosed herein. It should also be understood that method 10 is not limited to the particular embodiments described herein, but is capable of many embodiments without departing from the scope of the claims.

We claim:

1. A method for highlighting edges of interest in an image comprising the following steps:
    calculating edge intensity of the image using horizontal and vertical gradient operators, wherein the image comprises rows and columns of pixels;
    combining results from the horizontal and vertical gradient operators to produce a single image, which contains the relative intensity strengths (edge_strength) of all the edges in the image;
    transforming the edge_strength image according to the following equation:

```
if(edge_strength[n, m] > max(edge_strength) / 2)
    { edge_strength[n, m] = max(edge_strength) − edge_strength[n, m];
    }
``` where edge_strength[n,m] is the edge strength value of a pixel at row n, column m, and max(edge_strength) is a maximum value of edge_strength over the entire image such that strong intensity edges are deemphasized;
    normalizing results of the transformation to put the transformed edge strength values into the range [0,1]; and
    bidirectionally highlighting a given edge in the original image if the normalized transformed edge is greater than a threshold value to create an edge-highlighted image.

2. The method of claim 1, wherein the values of edge_strength are clipped to a max value.

3. The method of claim 1, wherein the step of bidirectionally highlighting comprises the steps of:
    determining whether or not the intensity value of each edge pixel to be highlighted in the original image is above a mid-point in an intensity range;
    darkening a given edge pixel to be highlighted if the intensity value of the given edge pixel is above the mid-point; and
    brightening a given edge pixel to be highlighted if the intensity value of the given edge pixel is below or equal to the mid-point.

4. The method of claim 3, wherein for a pixel in the original image that is greater than the mid-point of the intensity range, the following expression is used: a_edge[n, m]=a[n,m]/edge_strength[n,m], where a is the original image and a_edge is an edge highlighted image.

5. The method of claim 3, wherein the brightening step is performed according to the following equation:

```
if(a[n, m] < 0.5)
    { a_edge[n, m] = a[n, m] + edge_strength[n, m];
    }
``` where a represents the original image and a_edge represents the edge-highlighted image; and
    wherein the darkening step is performed according to the following equation:

```
else
    { a_edge[n, m] = a[n, m] · (1 − edge_strength[n, m]);
    }.
```

6. The method of claim 5, wherein the horizontal gradient operator is a Sobel operator (sobel_x) and the vertical gradient operator is a Sobel operator (sobel_y), and wherein the calculating edge intensity step produces two images the same size as the original image, wherein the horizontal gradient operator finds horizontal edges and the vertical gradient operator finds vertical edges, and wherein the two images are combined according to: edge_strength=|sobel_x|+|sobel_y|, where |•| an absolute value operator.

7. The method of claim 5 wherein the horizontal gradient operator is a Sobel operator (sobel_x) and the vertical gradient operator is a Sobel operator (sobel_y), the results of which are be combined as follows:

$$edge\_strength = \sqrt{(sobel\_x^2 + sobel\_y^2)}.$$

8. The method of claim 7, wherein the image is a monochrome image.

9. The method of claim 7, wherein the image is an intensity image from a color image or a single color plane.

* * * * *